Patented Apr. 10, 1951

2,548,025

UNITED STATES PATENT OFFICE 2,548,025

METHOD FOR THE PRODUCTION OF DI-ESTERS OF SUCCINIC ACID

Wilford Donald Jones, Summit, N. J., assignor to Celanese Corporation of America, a corporation of Delaware No Drawing. Application October 22, 1948, Serial No. 56,059

4 Claims. (Cl. 260—485)

This invention relates to a process for preparing organic acid esters, and relates more particularly to a process for preparing diesters of succinic acid by the reaction of succinonitrile with an alcohol.

As is well known, the diesters of succinic acid are important intermediates for the production of various chemicals, and there is a great need for a reliable and cheap source of these materials. It has previously been proposed that the diesters of succinic acid be prepared by the esterification of succinic acid but, although this process may be readily carried out with good yields, it has not come into widespread use owing to the high cost of the starting materials.

It is an important object of this invention to provide a novel process for the preparation of the diesters of succinic acid which will overcome the foregoing and other disadvantages of the processes hitherto proposed for this purpose, and which will be especially simple and efficient in operation.

A further object of this invention is the provision of a process for the preparation of diesters of succinic acid by the reaction of succinonitrile with an alcohol.

Still another object of this invention is to provide a process for the preparation of diesters of succinic acid by reacting succinonitrile with an alcohol in the presence of water and an acid.

Other objects of this invention will be apparent from the following detailed description and claims.

In accordance with my invention the diesters of succinic acid are prepared by the reaction of succinonitrile with an alcohol. The reaction is preferably carried out in the presence of water and an acid and yields of up to 90%, or more, of theory may be readily obtained.

An alcohol having the formula:

R—OH in which R is an organic group such as an alkyl, an aryl or a heterocyclic group may be employed in carrying out the process of this invention. The organic group R may be unsubstituted or may be substituted by halogens such as iodine, bromine or chlorine, or by various other groups such as nitro groups, alkyl groups, aryl groups or heterocyclic groups. Among the alcohols which are suitable are methyl alcohol, ethyl alcohol, butyl alcohol, secondary butyl alcohol, amyl alcohol, benzyl alcohol and furfuryl alcohol. In carrying out the process of the present invention, it is preferred to employ alcohols in which R is a lower alkyl group such as a methyl or preferably an ethyl group since they produce the highest yields of the diester.

For each mol of succinonitrile there is preferably employed at least a stoichiometric quantity or about two mols of the alcohol. If smaller proportions of the alcohol are employed there will be a corresponding decrease in the yield of the diester. Larger proportions of the alcohol up to about 4 mols for each mol of succinonitrile will improve the yield of the diester, since a certain portion of the alcohol is converted to an ether during the reaction and is not available for the formation of the diester. The additional quantity of alcohol, above about 2 mols for each mol of succinonitrile, should be at least sufficient to replace the quantity of alcohol lost from the reaction mixture in this manner. However, an excess of alcohol above about 4 mols for each mol of succinonitrile is undesirable since it lowers the reflux temperature of the reaction mixture excessively and thereby reduces the yield of the diester.

Among the acids and acidic compounds which may be present in the reaction mixture during the esterification, sulfuric acid is preferred. Other acids which are also suitable are benzene sulfonic acid, toluene sulfonic acid, ethyl hydrogen sulfate and diethyl sulfate. Since the acid reacts to form an ammonium salt during the esterification, one mol of a dibasic acid such as sulfuric acid, theoretically should be present in the reaction mixture for each mol of succinonitrile. I have found, however, that the highest yields are obtained when approximately twice this quantity or about 2 mols of a dibasic acid such as sulfuric acid are present in the reaction mixture for each mol of succinonitrile. With larger or smaller proportions of the acid, above about 3 mols or below about 2 mols for each mol of succinonitrile there is obtained a lower yield.

To obtain a satisfactory yield, it is essential that the reaction mixture contain at least twice as many mols of water as mols of succinonitrile. If this minimum quantity of water is not present in the reaction mixture, the yield of the diester will be reduced in direct proportion to the deficiency in the quantity of water.

The order in which the various components are added to the reaction mixture greatly affects the yields which are obtained. Thus, while it is possible to obtain good yields by adding a mixture of the alcohol, acid and water to the succinonitrile at elevated temperatures, I have discovered that better yields are obtained by slowly adding a mixture of the acid and water to a mixture of succinonitrile and the alcohol. In addition to improving the yield, this mode of addition avoids any carbonization of the reactants despite the high concentration of acid present. Moreover, it has been found that the total yield is improved if that quantity of the alcohol above about 2 mols for each mol of succinonitrile is added to the reaction mixture after the water and acid have been added thereto.

The reaction is preferably carried out at reflux temperatures ranging from about 80 to 180° C., and any ethers formed during the reaction should be continuously or periodically distilled from the reaction mixture during the reaction either at atmospheric pressure or under a partial vacuum to avoid a drop in the reflux temperature. Refluxing may be continued for between about 1 and 16 hours or until the reaction is substantially complete.

After the reaction is complete, the diester of succinic acid may be separated from the reaction mixture and purified in any desired manner. The diester forms a valuable intermediate for the production of various chemicals although it may also be used for other purposes. There is also obtained, in addition to the diester, a small yield of the monoester of succinic acid which may be recycled to convert it to the diester thereby increasing the total yield.

The following examples are given to illustrate this invention further.

*Example I*

Into a reaction vessel equipped with a reflux condenser, a dropping funnel, a stirrer and a thermometer well there is placed 80.1 parts by weight (1 mol) of succinonitrile and the reaction vessel is immersed into an oil bath maintained at a temperature of about 140° C. A mixture of 201 parts by weight (1.975 mols) of 96.3% sulfuric acid and 92 parts by weight (2 mols) of absolute ethyl alcohol containing a total of 36 parts by weight (2 mols) of water is introduced slowly into the reaction vessel over a period of 135 minutes. A strongly exothermic reaction takes place with the temperature rising to a maximum of about 172° C. within a few minutes after the initial addition of the sulfuric acid-alcohol-water mixture. Refluxing is continued for 315 minutes after the reactants have been introduced into the reaction vessel and the reaction mixture is then cooled. The cooled reaction mixture which contains some solid is agitated with 500 parts by weight of water until the solid is dissolved after which the mixture is filtered with the assistance of a filter aid. The diester is separated from the water layer and the latter is extracted three times with about 70 parts by weight of ethyl ether. The ethyl ether extract is added to the diester and the whole washed with 100 parts by weight of cold water and 100 parts by weight of 10% sodium bicarbonate. Thereafter, the diester is dried over calcium chloride, filtered and the major portion of the ethyl ether is removed therefrom by distillation over a water bath. The last of the ethyl ether is removed by distillation under 50 mm. vacuum and the diester distilled under vacuum from a Claisen head. There is obtained 112.8 parts by weight of the diethyl ester of succinic acid or 64.8% of theory.

*Example II*

Into a reaction vessel equipped with a reflux condenser, a dropping funnel, a stirrer and a thermometer well there is placed a mixture of 80.1 parts by weight (1 mol) of succinonitrile and 92 parts by weight (2 mols) of absolute ethyl alcohol and the reaction vessel is immersed into an oil bath maintained at a temperature of 90° C. A mixture of sulfuric acid and water containing 203 parts by weight (2 mols) of 96.3% sulfuric acid and a total of 36 parts by weight (2 mols) of water is introduced slowly into the reaction vessel over a period of 88 minutes. Refluxing is continued for 357 minutes at which time 50 parts by weight (1.09 mols) of absolute ethyl alcohol is added slowly to the reaction mixture over a period of 115 minutes. Refluxing is continued for an additional period of about 400 minutes. During the reflux period ethyl ether is periodically distilled from the reaction mixture to prevent a drop in the reflux temperature. The reaction vessel is cooled by stirring vigorously in a compressed air stream and, as the temperature of the reaction mixture drops, the heavy liquid phase containing ammonium sulfate and unreacted ethyl alcohol solidifies to a mass of white crystals. The cooled reaction mixture is agitated with 200 parts by weight of water which dissolves the white crystals and the diester layer is separated from the aqueous layer. The diester is distilled under vacuum without drying using a Claisen head. There is obtained 156.9 parts by weight of the diethyl ester of succinic acid or 90.0% of theory plus 4.8 parts by weight of the monoethyl ester of succinic acid or 3.3% of theory.

*Example III*

Into a reaction vessel equipped with a Dry-Ice cooled reflux condenser, a dropping funnel, a stirrer and a thermometer well there is placed a mixture of 80.1 parts by weight (1 mol) of succinonitrile and 138 parts by weight (3 mols) of absolute ethyl alcohol and the reaction vessel is immersed into an oil bath at a temperature of about 96° C. A mixture of sulfuric acid and water containing 203 parts by weight (2 mols) of 96.3% sulfuric acid and a total of 36 parts by weight (2 mols) of water is introduced dropwise into the reaction vessel over a period of 30 minutes. Refluxing is continued for an additional period of 345 minutes and during refluxing ethyl ether is removed periodically from the reaction mixture to prevent a drop in the reflux temperature. The diester is then separated and purified in the manner outlined in Example II. There is obtained 145.4 parts by weight of the diethyl ester of succinic acid or 83.5% of theory plus 10.2 parts by weight of the monoethyl ester of succinic acid or 7% of theory.

*Example IV*

Into a reaction vessel equipped with a reflux condenser, a dropping funnel, a stirrer and a thermometer well there is placed a mixture of 80.1 parts by weight (1 mol) of succinonitrile and 92 parts by weight (2 mols) of absolute ethyl alcohol and the temperature of the reactants is raised to 81.5° C. A mixture of sulfuric acid and water containing 213.8 parts by weight (2.1 mols) of 96.3% sulfuric acid and a total of 37.8 parts by weight (2.1 mols) of water is introduced dropwise into the reaction vessel over a period of 13 minutes the temperature rising to 125° C. during this addition. Refluxing is continued for 90 minutes at which time 50 parts by weight (1.09 mols) of absolute ethyl alcohol is added slowly to the reaction mixture over a period of 30 minutes. Refluxing is continued for an additional period of about 125 minutes. During the reflux period a total of 15 parts by weight of ethyl ether is distilled from the reaction mixture to prevent a drop in the reflux temperature. The diester is then separated and purified in the manner outlined in Example II. There is obtained 154.9 parts by weight of the diethyl ester of succinic acid or 89% of theory plus 11.0 parts by weight of the monoethyl ester of succinic acid or 7.5% of theory.

*Example V*

Into a reaction vessel equipped with a reflux condenser, a dropping funnel, a stirrer and a thermometer well there is placed a mixture of 80.1 parts by weight (1 mol) of succinonitrile and 64.0 parts by weight (2 mols) of absolute methyl alcohol and the reaction vessel is immersed into an oil bath maintained at about 109° C. A mixture of sulfuric acid and water containing 203 parts by weight (2 mols) of 96.3% sulfuric acid and a total of 36 parts by weight (2 mols) of water is introduced dropwise into the reaction vessel over a period of 35 minutes. After the strongly exothermic reaction initiated by the addition of the sulfuric acid-water mixture ceases, an additional 35 parts by weight (1.09 mols) of absolute methyl alcohol is added to the reaction mixture over a period of five minutes. Refluxing is continued for an additional period of 260 minutes and during refluxing methyl ether is removed periodically from the reaction mixture to prevent a drop in the reflux temperature. The diester is then separated and purified in the manner outlined in Example II. There is obtained 104 parts by weight of the dimethyl ester of succinic acid or 71% of theory.

It is to be understood that the foregoing detailed description is given merely by way of illustration and that many variations may be made therein without departing from the spirit of my invention.

Having described my invention, what I desire to secure by Letters Patent is:

1. In a process for the production of the diesters of succinic acid, the step which comprises adding a mixture of water and an acid to a mixture of succinonitrile and an alcohol, the molar quantity of water being at least about two times the molar quantity of succinonitrile, the molar quantity of acid, calculated as a dibasic acid, being between about two and three times the molar quantity of succinonitrile, and the molar quantity of alcohol being between about two and four times the molar quantity of succinonitrile.

2. In a process for the production of the diethyl ester of succinic acid, the step which comprises adding a mixture of water and sulfuric acid to a mixture of succinonitrile and ethyl alcohol, the molar quantity of water being at least about two times the molar quantity of succinonitrile, the molar quantity of sulfuric acid being about two and three times the molar quantity of succinonitrile, and the molar quantity of ethyl alcohol being between about two and four times the molar quantity of succinonitrile.

3. In a process for the production of the diesters of succinic acid, the steps which comprise adding a mixture of water and an acid to a mixture of succinonitrile and an alcohol, the molar quantity of water being at least about two times the molar quantity of succinonitrile, the molar quantity of acid, calculated as a dibasic acid, being between about two and three times the molar quantity of succinonitrile, and the molar quantity of alcohol being about two times the molar quantity of succinonitrile, and adding up to two mols of an additional quantity of alcohol to the reaction mixture in an amount at least sufficient to replace the alcohol which has been converted to an ether.

4. In a process for the production of the diethyl ester of succinic acid, the steps which comprise adding a mixture of water and sulfuric acid to a mixture of succinonitrile and ethyl alcohol, the molar quantity of water being at least about two times the molar quantity of succinonitrile, the molar quantity of sulfuric acid being between about two and three times the molar quantity of succinonitrile, and the molar quantity of ethyl alcohol being about two times the molar quantity of succinonitrile, and adding up to two mols of an additional quantity of ethyl alcohol to the reaction mixture in an amount at least sufficient to replace the ethyl alcohol which has been converted to an ether.

WILFORD DONALD JONES.

REFERENCES CITED

The following references are of record in the file of this patent:

UNITED STATES PATENTS

| Number | Name | Date |
|---|---|---|
| 1,790,262 | Christmann | Jan. 27, 1931 |
| 2,438,961 | Boese | Apr. 6, 1948 |

FOREIGN PATENTS

| Number | Country | Date |
|---|---|---|
| 887,252 | France | Aug. 2, 1943 |